United States Patent [19]

Coleman et al.

[11] 4,061,346

[45] Dec. 6, 1977

[54] CUP SEAL FOR USE IN A MASTER CYLINDER

[75] Inventors: John R. Coleman, Dayton; Dwight W. McDaniel, Trotwood, both of Ohio

[73] Assignee: General Motors Corporation, Detroit, Mich.

[21] Appl. No.: 761,884

[22] Filed: Jan. 24, 1977

[51] Int. Cl.² .............................................. F16J 15/32
[52] U.S. Cl. ..................................................... 277/205
[58] Field of Search ........... 277/205, 206, 207, 212 R; 92/85, 243, 244

[56] References Cited

U.S. PATENT DOCUMENTS

| 3,563,558 | 2/1971 | Doutt | 277/205 |
| 3,913,460 | 10/1975 | Wright | 277/205 |
| 3,915,463 | 10/1975 | Pippert | 277/205 |

Primary Examiner—Robert I. Smith
Attorney, Agent, or Firm—D. D. McGraw

[57] ABSTRACT

The lip of a cup seal for use in a master cylinder incorporates a semi-torus of material extending axially outward from the outer peripheral end of the seal lip. The added material is positioned immediately adjacent, but slightly radially inward from, the sharp lip edge. This added material prevents the lip from hanging up on the edges of compensation ports which open into the master cylinder bore, particularly during initial installation.

3 Claims, 3 Drawing Figures

CUP SEAL FOR USE IN A MASTER CYLINDER

The invention relates to a seal of the cup type, and more particularly to a seal of the type used in master cylinder assemblies. These seals are commonly referred to as lip or V-block seals. They are generally of annular construction with a main body section which extends radially, an inner peripheral lip extending axially toward the pressurizing chamber of the master cylinder, and a similar outer peripheral lip. This arrangement permits pressure to be generated on the side of the seal toward which the lips extend as the master cylinder is actuated, and, upon movement of the master cylinder piston in the pressure decreasing direction, permits brake fluid to flow past the outer peripheral lip as needed. One of the usual features of master cylinders is the provision of compensation ports which extend into the master cylinder bore from the brake fluid reservoir. In the dual master cylinders in common use, two pressurizing pistons are provided and each has a pressure cup or seal of the type to which the invention relates. Two pairs of compensation ports are provided, the forward one of each pair being of relatively small diameter and the rearward one of each pair being of somewhat larger diameter. During initial installation of the piston assembly, including the cup seals, the forward edges of the seal outer peripheral lips will occasionally become scored by the edges of the larger compensation port or ports. This usually occurs radially inward of the lip edge defined by the intersection of the forward end surface of the lip and the lip outer peripheral surface.

It has been found that by providing an annular bead section on the forward end surface of the seal lip, and slightly radially inward of the lip outer edge, the seal can be inserted past the larger compensation port or ports with the bead section causing the seal lip to roll past the compensation ports, thereby eliminating the possibility of scoring of the front end surface of the seal. Once installed, the cup-like pressurizing seals do not pass over the larger compensation ports during normal master cylinder actuation and release, and the annular bead sections are non-functional. The smaller compensation ports, which open into the master cylinder pressurizing chambers when the pressurizing pistons are in the released position, and which are closed by the cup seals during initial master cylinder actuation, are sufficiently small that the seal annular bead sections do not usually come into play, and the function during installation is not required under these conditions.

IN THE DRAWING

Figure 1:
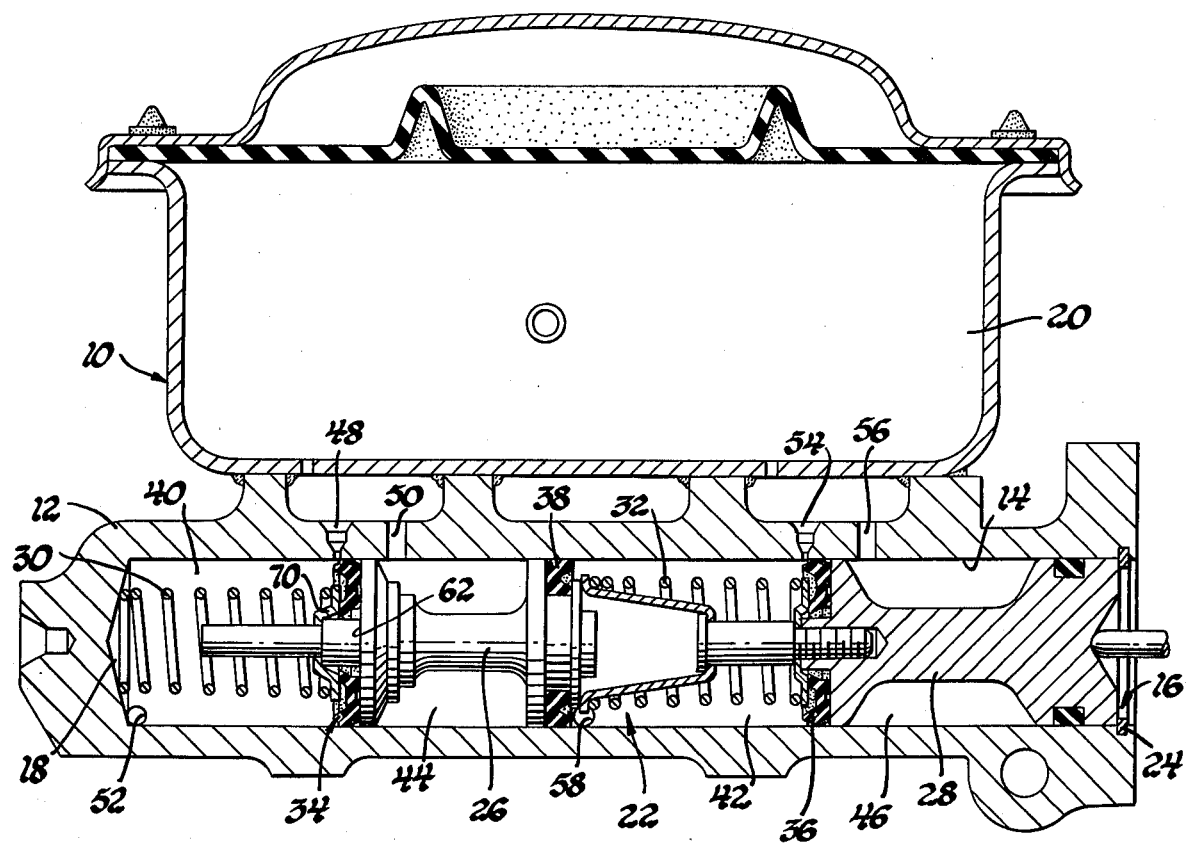
FIG. 1 is a cross section view of a typical dual master cylinder having pressurizing seals embodying the invention.

The master cylinder assembly 10 includes a housing 12 provided with a bore 14 open at its rear end 16 and closed at its front end 18. A brake fluid reservoir 20 is provided as a part of the master cylinder assembly. The pressurizing piston assembly 22 is inserted in the bore 14 and prevented from escaping the bore by a piston stop 24. The assembly 22 is illustrated as including a primary piston 26 and a secondary piston 28 which are in axial alignment in bore 14. Piston return springs 30 and 32 are provided to urge the pistons to the released position shown. Primary piston 26 has a primary pressurizing cup seal 34, and secondary piston 28 has a similar secondary pressurizing cup seal 36. Another cup or V-block seal 38 is provided on the rear end of piston 26. Primary pressurizing chamber 40 is defined by the forward end of piston 26, cup 34, and the forward end 18 of bore 14. The secondary pressurizing chamber 42 is defined by the forward end of secondary piston 28 and cup 36, the rearward end of piston 26 and cup 38, and a center portion of bore 14. Pistons 26 and 28 are generally spool shaped so that they cooperate with bore 14 to define annular chambers 44 and 46. Primary compensation ports 48 and 50 are provided through the housing 12 of the master cylinder assembly to communicate a forward portion of bore 14 with the reservoir 20. In the master cylinder released position, cup seal 34 is positioned axially between the openings of ports 48 and 50 into bore 14. Port 48 has a relatively small diameter opening, while port 50 is of somewhat larger diameter. Port 50 is so positioned that it always provides fluid communication between the reservoir 20 and annular chamber 44. Port 48 is so positioned relative to the forward edge of the cup seal that slight pressurizing movement of piston 26 and cup seal 34 will cause the port to be closed to interrupt fluid communication between reservoir 20 and pressurizing chamber 40. Further forward movement of piston 26 will pressurize fluid in chamber 40. As is well known, this fluid is conducted through an outlet 52 to a brake circuit.

Secondary compensation ports 54 and 56 are similar to ports 48 and 50. Port 56 maintains continuous fluid communication between reservoir 20 and annular chamber 46. Port 54 is located so that it may be closed by slight brake actuating movement of piston 28 and cup seal 36. Brake fluid is then pressurized in chamber 42 and delivered to a brake circuit through outlet 58.

Figure 2:
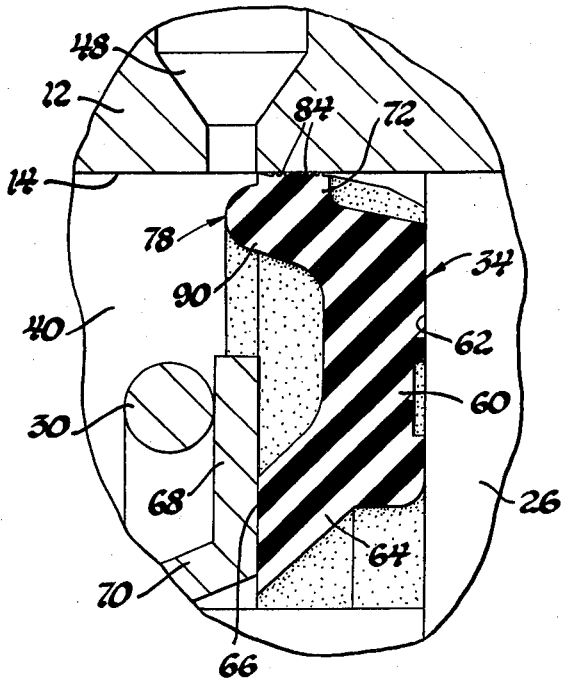
FIG. 2 is a fragmentary enlarged cross section view of the primary pressurizing seal of FIG. 1.
Figure 3:
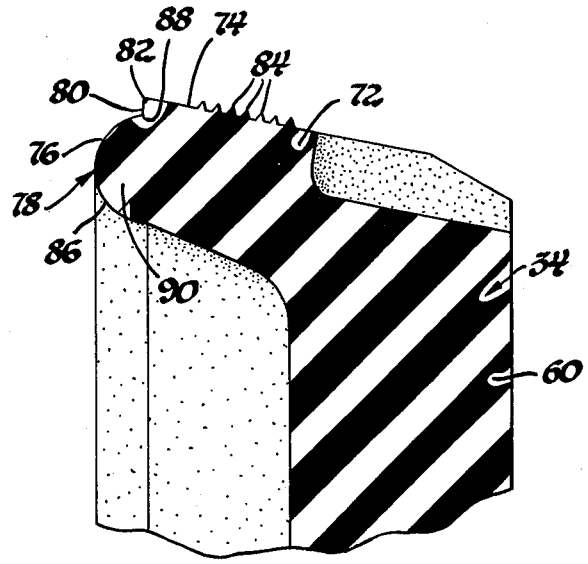
FIG. 3 is an enlarged cross section view, with parts broken away, of a portion of the primary seal of FIGS. 1 and 2 and showing the seal in its free condition before it is installed in the master cylinder bore.

As illustrated in FIGS. 2 and 3, the cup seal 34 has an annular center portion 60 which extends radially so that it is backed by the annular surface 62 of piston 26. An inner peripheral lip 64 extends axially forward from center section 60 and also radially inward. Lip 64 has a forward end surface 66 which is engaged by the flange 68 of the spring seat 70 for spring 30. Cup seal 34 has an outer peripheral lip 72 which extends axially forward from center portion 60 and also radially outwardly when the cup seal is in the free position illustrated in FIG. 3. Lip 72 has an outer peripheral surface 74 and a forward edge surface 76. Surface 76 is at the axial end 78 of the lip. It has an annular flat surface section 80 which extends radially outward to intersect surface 74. The sharp lip edge 82 is defined by the intersection of surfaces 74 and 80. Section 74 is also illustrated as having small annular friction reducing beads 84 extending therefrom and engaging the surface of bore 14 after installation. To this point at which seal 34 has been particularly described, it is of a construction currently in common use, with all of the surface 76 being coincident with surface 80.

In accordance with the invention, the portion of surface 76 radially inward from surface 80 is a convex or arcuate surface section 86 which has its outer peripheral edge at the inner peripheral edge 88 of the annular flat surface 80. The material contained within arcuate surface 86 defines an annular bead section 90 which may be described as a semi-torus of material extending axially outward on the outer end of the outer peripheral lip 72 of cup seal 34. In practice, it has been found to be advantageous to have the radial width of annular flat surface 80 to be somewhat less than 0.015 to 0.020 inches from the sharp lip edge 82. This locates the bead section 90 in a position which effectively eliminates the extrusion of the lip edge 82 into compensation ports 56 and 50 as seal 34 is installed, eliminating the possibility that the sharp edges of these ports where they open up into bore 14 can score the forward end of lip 72. When such scoring occurred to seals of the prior type, it was found to occur at about 0.015 to 0.020 inches radially inward from the lip edge 82. The annular bead section 90 tends to cam the seal lip back out of the compensation ports so that no scoring occurs even if the lip initially extrudes slightly into the ports. This is believed to give a rolling action removing the seal lip from the ports.

Once seal 34 has been installed past compensation ports 56 and 50, it does not again move past the openings of these ports during master cylinder operation. Therefore after installation the annular bead section is non-functional. Seal 36 may be constructed in a manner identical to that of seal 34, even though it has to be installed past only one port 56. While it is less likely to be scored, it is usually better practice to use identical pressurizing seals where design permits.

What is claimed is:

1. A cup seal for use on master cylinder pistons and the like, said seal comprising:

an annular body having an inner peripheral first seal lip in the free position extending axially and radially inwardly, a radially extending center portion from which said inner peripheral seal lip extends, and an outer peripheral seal second seal lip in the free position extending axially and radially outwardly from said center portion in the same axial direction as said first seal lip;

said second seal lip having an axial end defined by a surface, and an outer peripheral surface joined to said axial end surface at adjacent sides by a sharp lip edge, said lip being supported to extend axially by the lip material with said axial end of said lip extending axially away from said seal center portion, said axial end surface including a radially outer annular flat surface defined at its outer peripheral edge by said sharp lip edge and a substantially semi-circular cross section convex surface joining the inner peripheral edge of said annular flat surface and extending axially away from said seal center portion.

2. In an annular cup seal having a pair of radially spaced axially extending lips, each of said lips having a radially extending axial end surface and a lip edge, said lip edge of the radially outer one of said lips being adapted to move across an opening such as a master cylinder compensation port and having means for preventing the lip edge from hanging up on the edge of such ports during such movement, said means comprising:

an annular bead section having an arcuate surface, said annular bead section being formed on the axial end surface of said radially outer lip radially inward of but immediately adjacent to said lip edge and extending axially from said lip axial end surface.

3. A lip seal having an annular body portion with an axially extending annular lip extending therefrom, said lip being adapted to slide in a bore having a port opening in the bore wall at a point over which said lip passes, said lip having a radially extending axial end surface axially opposite said body portion, said axial end surface having a portion thereof formed with a bead of semitorus cross section, an outer peripheral surface, and a lip sharp edge defined by the junction of said axial end surface and said outer peripheral surface, said bead being spaced inwardly from but immediately adjacent to said lip sharp edge and extending axially away from said body portion, said head being adapted to cam said lip edge past said port without scoring said lip.

* * * * *

UNITED STATES PATENT AND TRADEMARK OFFICE
CERTIFICATE OF CORRECTION

PATENT NO. : 4,061,346
DATED : December 6, 1977
INVENTOR(S) : John R. Coleman, Dwight W. McDaniel It is certified that error appears in the above-identified patent and that said Letters Patent are hereby corrected as shown below:

Column 2, line 44, "seal" (first occurrence) should read -- seat --.

Column 4, line 38, claim 3, "head" should read -- bead --.

Signed and Sealed this

Ninth Day of May 1978

[SEAL]

Attest:

RUTH C. MASON
Attesting Officer

LUTRELLE F. PARKER
Acting Commissioner of Patents and Trademarks